(12) United States Patent
Grimm et al.

(10) Patent No.: US 11,040,357 B2
(45) Date of Patent: Jun. 22, 2021

(54) FLUID APPLICATION SYSTEM INCLUDING ELECTRICALLY-ACTUATED VALVES AND FLUID RETURN LINE

(71) Applicant: Capstan Ag Systems, Inc., Topeka, KS (US)

(72) Inventors: Jeffrey John Grimm, Holton, KS (US); Andrew J. Holtz, Berryton, KS (US); Jesse Koch, Topeka, KS (US)

(73) Assignee: Capstan Ag Systems, Inc., Topeka, KS (US)

( * ) Notice: Subject to any disclaimer, the term of this patent is extended or adjusted under 35 U.S.C. 154(b) by 205 days.

(21) Appl. No.: 16/262,370

(22) Filed: Jan. 30, 2019

(65) Prior Publication Data

US 2019/0232304 A1    Aug. 1, 2019

Related U.S. Application Data

(60) Provisional application No. 62/624,441, filed on Jan. 31, 2018.

(51) Int. Cl.
| | |
|---|---|
| *B05B 1/30* | (2006.01) |
| *A01C 23/00* | (2006.01) |
| *A01C 7/04* | (2006.01) |
| *B05B 12/12* | (2006.01) |
| *B05B 12/08* | (2006.01) |
| *B05B 12/00* | (2018.01) |
| *A01C 7/06* | (2006.01) |
| *B05B 13/00* | (2006.01) |

(52) U.S. Cl.
CPC ............ *B05B 1/3093* (2013.01); *A01C 7/046* (2013.01); *A01C 7/06* (2013.01); *A01C 23/007* (2013.01); *B05B 12/006* (2013.01); *B05B 12/085* (2013.01); *B05B 12/126* (2013.01); *B05B 12/081* (2013.01); *B05B 13/005* (2013.01)

(58) Field of Classification Search
CPC ... B05B 1/3093; B05B 12/006; B05B 12/085; B05B 12/126; B05B 12/081; B05B 13/005; B05B 1/30; B05B 1/00; B05B 12/004; B05B 12/00; B05B 12/08; B05B 12/12; B05B 13/00; A01C 7/044; A01C 7/042; A01C 7/04; A01C 7/00; A01C 23/00; A01C 7/046; A01C 7/06; A01C 23/007
See application file for complete search history.

(56) References Cited

U.S. PATENT DOCUMENTS

| | | |
|---|---|---|
| 4,069,844 A | 1/1978 | Zahid |
| 4,080,996 A | 3/1978 | Zahid |

(Continued)

*Primary Examiner* — Christopher J. Novosad
(74) *Attorney, Agent, or Firm* — Armstrong Teasdale LLP

(57) ABSTRACT

A fluid application system includes a fluid supply line connected to a fluid supply, a plurality of nozzle assemblies connected in fluid communication with the fluid supply line, and a return line. Each nozzle assembly includes an inlet connected to the fluid supply line, a nozzle defining a spray outlet, a return line outlet, and an electrically actuated three-way valve fluidly connected between the inlet and each of the spray outlet and the return line outlet. The three-way valve is configured to alternately direct fluid from the inlet to the return line outlet and the spray outlet. The return line is connected in fluid communication with the return line outlet of each nozzle assembly, and is configured to direct fluid from the return line outlet to the fluid supply line.

20 Claims, 8 Drawing Sheets

(56) References Cited

U.S. PATENT DOCUMENTS

| | | |
|---|---|---|
| 4,121,767 A | 10/1978 | Jensen |
| 4,479,465 A * | 10/1984 | Flynn ................ F02M 37/0029 |
| | | 123/514 |
| 4,552,182 A | 11/1985 | Graham et al. |
| 5,134,961 A | 8/1992 | Giles et al. |
| 5,351,887 A | 10/1994 | Heterington et al. |
| 5,427,350 A | 6/1995 | Rinkewich |
| 5,904,296 A | 5/1999 | Doherty et al. |
| 5,911,362 A | 6/1999 | Wood et al. |
| 5,927,603 A | 7/1999 | McNabb |
| 5,967,066 A | 10/1999 | Giles et al. |
| 6,173,904 B1 | 1/2001 | Doherty et al. |
| 6,189,807 B1 | 2/2001 | Miller et al. |
| 6,883,726 B2 | 4/2005 | Polk et al. |
| 9,226,442 B2 | 1/2016 | Grimm et al. |
| 9,763,381 B2 | 9/2017 | Grimm et al. |

* cited by examiner

FLUID APPLICATION SYSTEM INCLUDING ELECTRICALLY-ACTUATED VALVES AND FLUID RETURN LINE

CROSS-REFERENCE TO RELATED APPLICATION

This application claims priority to U.S. Provisional Patent Application Ser. No. 62/624,441, filed on Jan. 31, 2018, the disclosure of which is hereby incorporated by reference in its entirety.

BACKGROUND

The field of this disclosure relates generally to fluid application systems and, more particularly, to systems for applying fluid to agricultural fields.

In the agricultural industry, agricultural fluids or agrochemicals are commonly applied to plants and/or plant precursors (e.g., seeds) for a variety of reasons. For example, plants and plant precursors are often sprayed with an agricultural fluid at the time of planting to enhance germination and early development. In other applications, liquid fertilizers, pesticides, and other agrochemicals may be applied to plants or crops after planting for crop management. Agricultural fluids include, without limitation, growth promotors, growth regulators, spray fertilizers, pesticides, insecticides, and/or fungicides.

Typically, systems for applying agricultural fluids to fields include a manifold, e.g., a boom pipe, and a plurality of nozzle assemblies that receive fluid from the manifold for applying the fluid to a field. In at least some known systems, the fluid is supplied to the manifold through an inlet located between opposed ends of the manifold. The fluid travels longitudinally through the manifold from the inlet toward the opposed ends. As the fluid flows towards the opposed ends, a portion of the fluid is directed out of the manifold towards the nozzle assemblies for application to the fields.

For some applications, it is desirable to regulate or control the fluid application rate (i.e., amount of fluid applied per unit area, such as an acre) and/or the fluid flow rate (i.e., volume per unit time) through the nozzle assemblies at a preset rate and/or based on user specified parameters. In some seed planting systems, for example, it may be desirable to dispense a consistent amount of fluid on or adjacent to each seed dispensed from the seed planting system.

In some systems, pulsing or pulse-width-modulated (PWM) valves are used to control delivery of fluid at a desired rate and/or time. The continuous pulsing or opening and closing of such valves can result in dynamic flow or pressure fluctuations within fluid application systems, making it difficult to precisely control the fluid application rate or the fluid flow rate through the nozzle assemblies. For example, fluctuations in fluid pressure upstream from the nozzle assemblies can affect the fluid flow rate through the nozzle assemblies. As a result, fluctuations in the pressure of fluid supplied to the nozzles may make it difficult to precisely control the fluid application rate and/or the fluid flow rate through individual nozzle assemblies.

Additionally, pressure fluctuations within a fluid application system may result in inaccurate readings from turbine flow meters positioned upstream of the nozzles, and unstable valve inlet and outlet conditions resulting from inertia, momentum, resistance and capacitance upstream and downstream of the valve. This can further lead to rhythmic maximum opening pressure differential (MOPD) issues from natural and unnatural frequencies, causing calculated calibrations to be different at various flows and pressures.

Accordingly, a need exists for fluid application systems that reduce or decrease fluctuations in fluid pressure within the fluid application systems.

BRIEF SUMMARY

In one aspect, a fluid application system includes a fluid supply line connected to a fluid supply, a plurality of nozzle assemblies connected in fluid communication with the fluid supply line, and a return line. Each nozzle assembly includes an inlet connected to the fluid supply line, a nozzle defining a spray outlet, a return line outlet, and an electrically actuated three-way valve fluidly connected between the inlet and each of the spray outlet and the return line outlet. The three-way valve is configured to alternately direct fluid from the inlet to the return line outlet and the spray outlet. The return line is connected in fluid communication with the return line outlet of each nozzle assembly, and is configured to direct fluid from the return line outlet to the fluid supply line.

In another aspect, a seed planting system for dispensing fluid on or adjacent to seeds dispensed from the system includes a seed dispenser configured to dispense seeds through at least one of a plurality of seed dispensing outlets and into a furrow, a fluid supply line connected to a fluid supply, a plurality of nozzle assemblies connected in fluid communication with the fluid supply line, and a return line connected. Each nozzle assembly is located proximate to a respective one of the plurality of seed dispensing outlets and includes an inlet connected to the fluid supply line, a nozzle defining a spray outlet, a return line outlet, and an electrically actuated three-way valve fluidly connected between the inlet and each of the spray outlet and the return line outlet. The three-way valve is configured to alternately direct fluid from the inlet to the return line outlet and the spray outlet to dispense fluid on or adjacent to each seed. The return line is connected in fluid communication with the return line outlet of each nozzle assembly, and is configured to direct fluid from the return line outlet to the fluid supply line.

In yet another aspect, a fluid application system includes a fluid supply line connected to a fluid supply, a plurality of nozzle assemblies connected in fluid communication with the fluid supply line, and a return line. Each nozzle assembly includes an inlet connected to the fluid supply line, a nozzle defining a spray outlet, a return line outlet, and a valve assembly that includes at least one electrically-actuated valve fluidly connected between the inlet and each of the spray outlet and the return line outlet. The valve assembly is configured to alternately direct fluid from the inlet to the return line outlet and the spray outlet. The return line is connected in fluid communication with the return line outlet of each of nozzle assembly, and is configured to direct fluid from the return line outlet to the fluid supply line.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

DETAILED DESCRIPTION OF THE DRAWINGS

Figure 1:
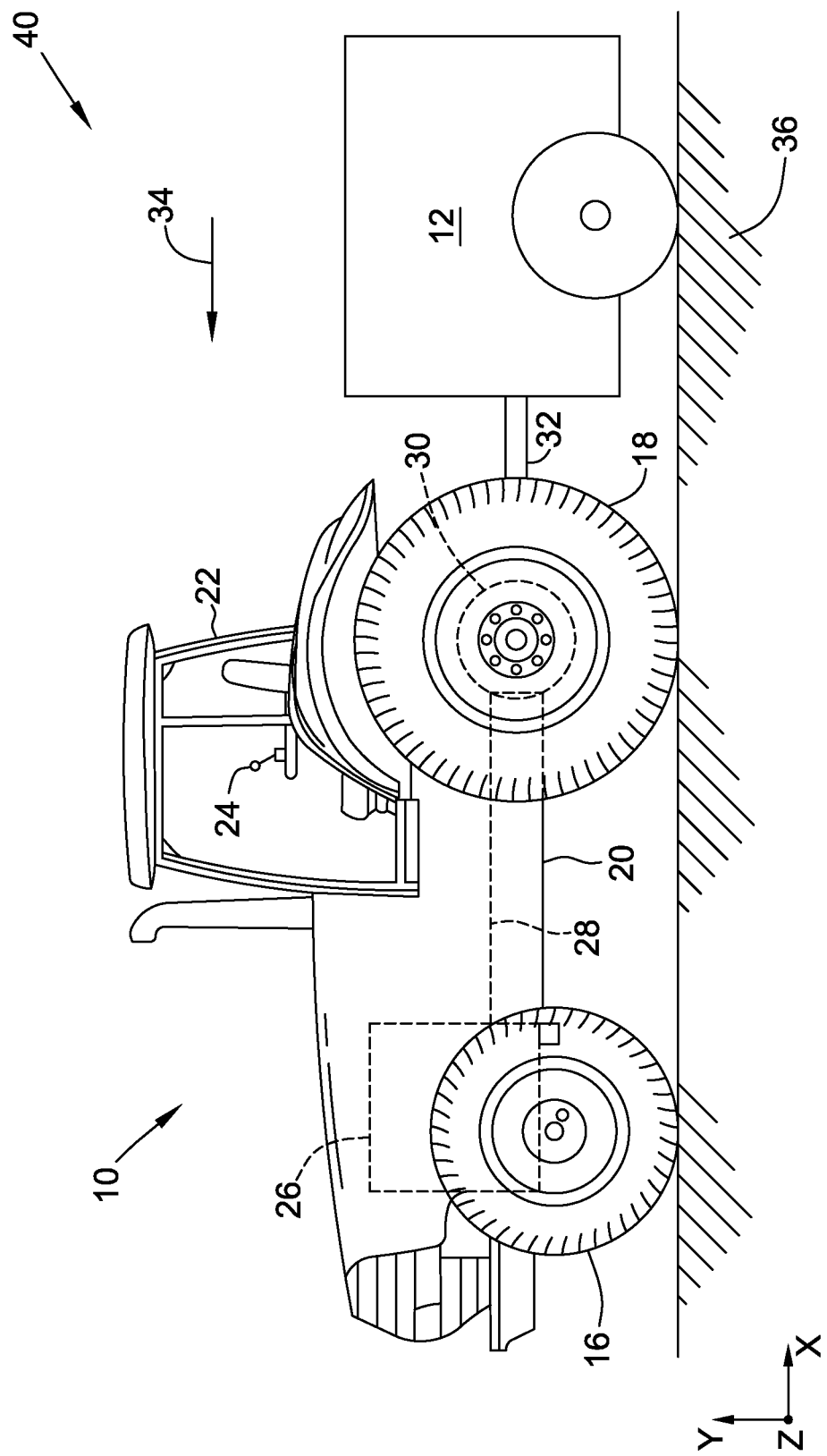
FIG. 1 is a side schematic view of one embodiment of a seed planting system.

Referring now to FIG. 1, one embodiment of a seed planting system is designated in its entirety by the reference number 40. Unless otherwise noted, directions, such as horizontal and vertical, refer to the orientation of the seed planting system 40 shown in FIG. 1.

The seed planting system 40 includes a motorized vehicle 10 and a planter 12 (shown schematically as a box in FIG. 1) for use in planting and spraying seeds. The motorized vehicle 10 is connected, fixedly or removably, to planter 12 and provides locomotion to seed planting system 40 and/or otherwise controls components of seed planting system 40. In the illustrated embodiment, motorized vehicle 10 is a tractor, although any other suitable vehicles or machines may be used to provide locomotion to seed planting system 40 and provide for control of seed planting system 40. In some embodiments, one or more components of the seed planting system 40 may be incorporated into the motorized vehicle 10 without departing from some aspects of this disclosure.

As shown in FIG. 1, the motorized vehicle 10 includes a pair of front wheels 16, a pair or rear wheels 18, and a chassis 20 connected to and supported by the wheels 16, 18. A cab 22 is supported by a portion of the chassis 20 and houses various control devices 24 for permitting an operator to control operation of the motorized vehicle 10. In some embodiments, control devices 24 may also permit control of planter 12. The motorized vehicle 10 also includes an engine 26 and a transmission 28 mounted on the chassis 20. The transmission 28 is operably connected to the engine 26 and provides variably adjusted gear ratios for transferring engine power to the wheels 18 via an axle/differential 30. Additionally, as shown in FIG. 1, the motorized vehicle 10 may be configured to be connected to planter 12 via a suitable coupling 32 such that vehicle 10 may pull planter 12 as it moves in a travel direction (indicated by arrow 34) along a field 36. It should be understood that any other suitable vehicle or machine may be used to provide locomotion to seed planting system 40 and provide for control of seed planting system 40. In some embodiments, for example, vehicle 10 may include tracks instead of or in addition front wheels 16 and/or wheels 18. Additionally, in some embodiments, vehicle 10 may be an autonomous vehicle with no cab 22.

Figure 2:
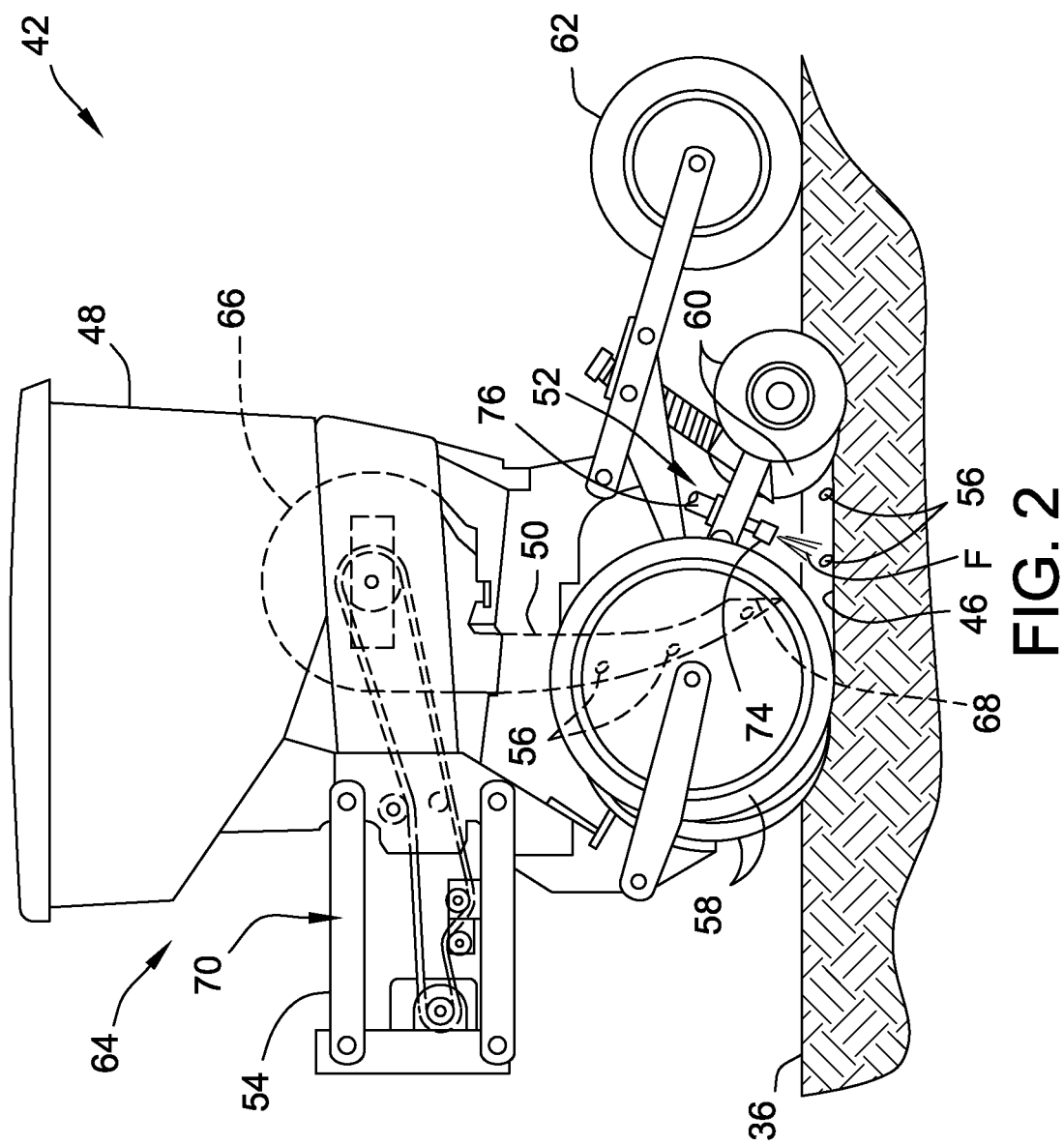
FIG. 2 is a side view of a portion of the seed planting system of FIG. 1.

Referring to FIG. 2, planter 12 includes a plurality of row units 42. Row units 42 are configured to at least spray a fluid on and/or adjacent to seeds and/or plants and, in some embodiments, are configured to plant seeds and spray the fluid on and/or adjacent to the seeds. Seed planting system 40 further includes a controller 44 (shown in FIG. 3) for controlling row units 42. Controller 44 is located in a cab or other occupant space (e.g., cab 22) for the operator of seed planting system 40. In alternative embodiments, controller 44 is located remote from row units 42 and an associated vehicle and allow for remote control of row units 42.

Row unit 42 is configured to create a furrow 46 using a furrow creation device, to meter and dispense seeds into the furrow 46 from a seed hopper 48 using a seed tube 50, and to spray a fluid F using a nozzle assembly 52. Row unit 42 may include any number of components such that row unit 42 performs these functions for a single row or a plurality of rows simultaneously. For example, in some embodiments, row unit 42 includes a plurality of furrow creation devices, seed tubes 50 fed from seed hoppers 48 (e.g., each seed hopper 48 fed from a single, shared master seed hopper, not shown), and nozzle assemblies 52 along the track of row unit 42 and planter 12. Planter 12 includes a frame 54 extending along the width of the planter 12 (e.g., in a direction transverse to the travel direction 34 of planter 12) that supports row units 42.

The furrow creation device of planter 12 is configured to create a trench or furrow 46 within the field or ground 36 for planting seeds 56. In several embodiments, the furrow creation device includes a pair of laterally spaced opening discs 58, a pair of laterally spaced closing discs 60 and a press wheel 62. The opening discs 58 are configured to open a furrow 46 within ground 36. Seeds 56 are deposited into the furrow 46 (e.g., by seed tube 50), and closing discs 60 are configured to close furrow 46 over seeds 56. Press wheel 62 is configured to compact the soil that has been closed over seeds 56. In alternative embodiments, furrow creation device may include other suitable components for creating furrow 46. In further alternative embodiments, planter 12 does not include a furrow creation device but rather plants and/or sprays in an existing furrow 46 (e.g., created by another machine).

Row unit 42 includes a seeder assembly 64 including seed hopper 48, a seed meter 66, and seed tube 50. Seed hopper 48, seed meter 66, and seed tube 50 are configured to dispense seeds 56 into furrow 46. For example, seed hopper 48 is any suitable container or other storage device configured for storing and dispensing seeds 56 into seed meter 66. Seed meter 66 is any suitable seed meter configured to dispense seeds 56 into seed tube 50 at a metered rate. In one embodiment, seed meter 66 includes a housing and a seed plate or disc rotatably supported within the housing. The seed disc includes a plurality of indentions, channels and/or other suitable recessed features that are spaced apart from one another around the seed disc (e.g., in a circular array) to allow seeds 56 to be dispensed at a given frequency. Specifically, each recessed feature is configured to grab a single seed 56 (e.g., via a vacuum applied to the recessed feature) as such recessed feature is rotated past the location at which seeds 56 are fed into the housing from seed hopper 48. As the seed disc is rotated, seeds 56 are carried by the recessed features and dispensed into seed tube 50. The metered rate may be predetermined, set, changed, or otherwise controlled (e.g., by the control system of planter 12 or mechanically based on a rate of travel of row unit 42). Seeds 56 are dispensed from an outlet 68 of seed tube 50 into furrow 46. For example, at a given rotational speed for the seed disc, the seed meter 66 dispenses seeds 56 at a constant frequency. When planter 12 travels at a constant speed, seeds 56 are spaced apart equally from one another within furrow 46. As the travel speed of the planter 12 increases or decreases, the rotational speed of the seed disc must also be increased or decreased to maintain equal spacing or a predetermined spacing of seeds 56 within the furrow 46. Such variation of the rotational speed of the seed disc is provided by a drive system 70 and/or controller 44.

Drive system 70 is or includes any suitable device and/or combination of devices configured to rotate the seed disc of seed meter 66. An example of a suitable drive system is described, for example, in U.S. Pat. No. 9,226,442, issued Jan. 5, 2016, which is hereby incorporated by reference in its entirety.

Figure 3:
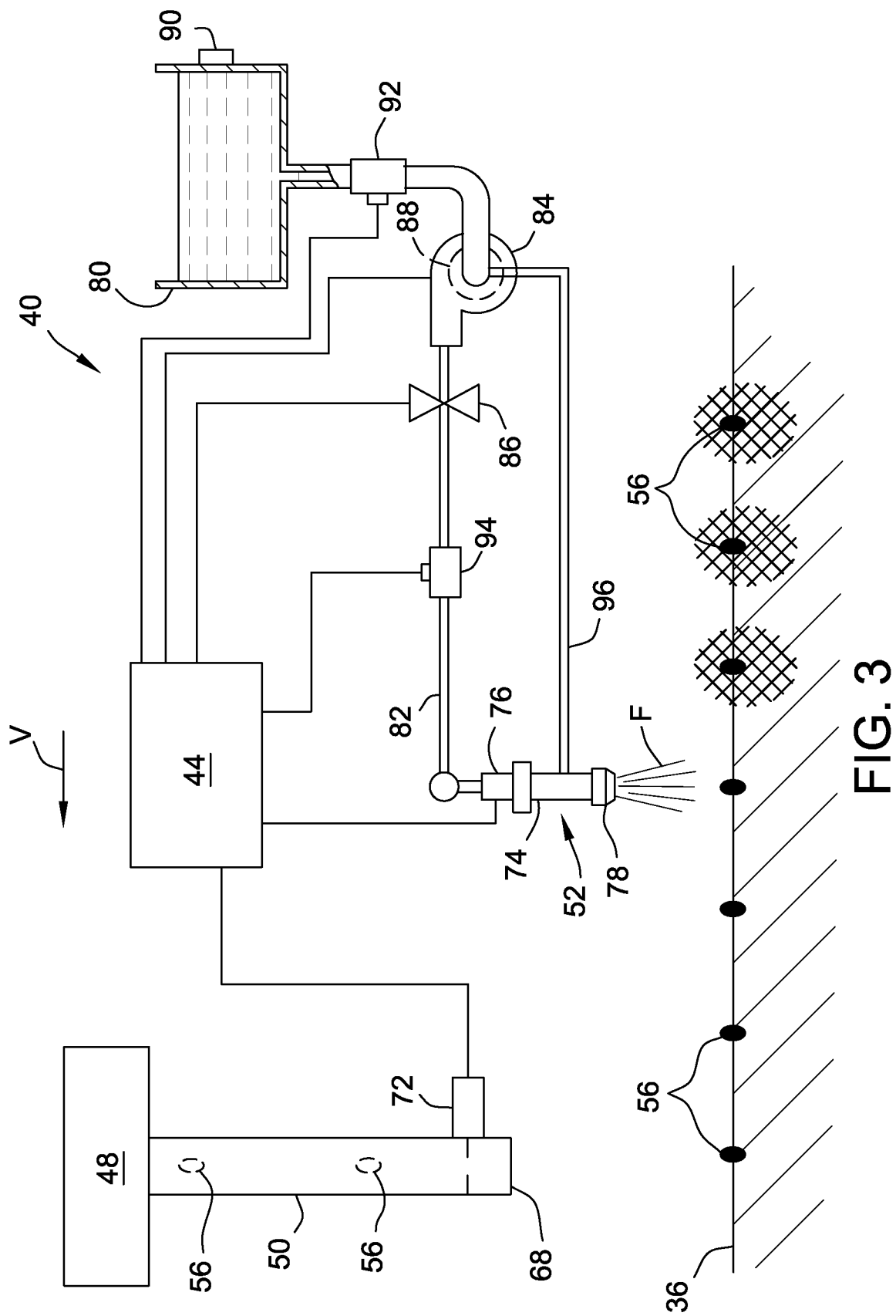
FIG. 3 is schematic view of a portion of the seed planting system shown in FIGS. 1 and 2.

With additional reference to FIG. 3, each row unit 42 further includes a seed sensor 72 operatively connected to the seed tube 50 for detecting each seed 56 as it drops through the seed tube 50. Suitable seed sensors may include optical sensors and/or any other suitable object sensor known in the art. The seed sensor 72 may be communicatively connected to controller 44 such that, each time the seed sensor 72 detects a seed 56 dropping through the seed tube 50, a signal may be transmitted from the seed sensor 72 to the controller 44.

In alternative embodiments, row unit 42 is or includes other suitable components for dispensing seeds 56. In further alternative embodiments, seed planting system 40 does not include seed hopper 48, a seed meter 66, seed tube 50, seed sensor 72, or other components for dispensing seeds 56, and instead sprays existing seeds 56 or existing plants. In such embodiments, row unit 42 does not include seeder assembly 64.

Each row unit 42 further includes at least one nozzle assembly 52 configured to spray fluid F. Seed planting system 40 includes a plurality of row units 42, and thus, a plurality of nozzle assemblies 52. Each nozzle assembly 52 is located proximate to a respective one of the plurality of seed tube outlets 68 and is configured to spray fluid F, or a combination of fluids, on, adjacent to, or otherwise in relation to seeds 56 dispensed by seed tube 50 or existing plants. Nozzle assembly 52 includes a spray nozzle 74 and a valve 76 (e.g., a solenoid valve). Nozzle 74 is any suitable spray nozzle suitable for an agricultural spraying system. In this embodiment, valve 76 is a three-way pulsing valve and may generally have any suitable three-way valve configuration that enables seed planting system 40 to function as described herein. In some embodiments, for example, valve 76 may be configured as a latching solenoid valve, 2WNC solenoid valve, pilot actuated solenoid valve, flipper solenoid valve and/or the like. Valve 76 is configured to be mounted to and/or integrated within a portion of spray nozzle 74 or nozzle assembly 52 using any suitable mounting configuration and/or any other suitable configuration that permits control of the flow of fluid F through the nozzle 74. For example, valve 76 is a solenoid valve positioned relative to spray nozzle 74 and controlled by controller 44 such that flow of fluid F through spray nozzle 74 is modified using pulse-width-modulation (PWM) control of valve 76. In other embodiments, valve 76 may be located remote from nozzle 74. In some embodiments, for example, valve 76 may be mounted or connected to the boom pipe or manifold used to supply fluid to nozzle assemblies 52. In some embodiments, nozzle assembly 52 also includes a spray tip 78 (shown in FIG. 3), such as a flat fan tip, cone tip, straight stream tip and/or any other suitable spray tip known in the art, connected to spray nozzle 74 and configured to produce a desired spray pattern.

Fluid F is supplied to nozzle assembly 52 from any suitable fluid source, such as a fluid tank 80, via a fluid supply line 82, such as a boom pipe, manifold, or other suitable flow conduit. Each nozzle assembly 52 is connected in fluid communication with fluid supply line 82 to receive fluid therefrom. In the illustrated embodiment, a pump 84, such as a centrifugal pump or positive displacement pump, is positioned upstream of the nozzle assembly 52 (specifically, between fluid tank 80 and fluid supply line 82) for pumping fluid F from the fluid source to the nozzle assembly 52. Pump 84 pressurizes the fluid supply line 82 with fluid from fluid tank 80, and nozzle assembly 52 and/or valves 76 controls flow of the pressurized fluid through spray nozzle 74. In some embodiments, row unit 42 includes a plurality of nozzle assemblies 52 for spraying fluid in parallel rows. In further embodiments, a single nozzle assembly 52 is configured to spray fluid in two or more parallel rows. In still further embodiments, row unit 42 includes a plurality of nozzle assemblies 52 positioned to spray a single row (e.g., furrow). For example, each nozzle assembly 52 may spray a different fluid and may be controlled, by controller 44, together or individually (e.g., allowing for different spray band lengths and/or offset distances from seeds 56).

As shown in FIG. 3, valve 76 is communicatively connected to controller 44. Controller 44 is configured to transmit a suitable control signal to valve 76 to cause it to open, remain open for a calculated duration, and close, thereby spraying a metered amount of fluid F on and/or adjacent to seed 56.

It should be appreciated that controller 44 may be configured to determine when to open and close valve 76 by analyzing various operating parameters of system 40, which may be pre-stored within the controller's memory and/or received by controller 44 as an input. Such operating parameters may include, but are not limited to, the vertical distance each seed 56 falls between seed sensor 72 and ground 36, the horizontal distance between the outlet of seed tube 50 and nozzle assembly 52, the speed V of system 40 and/or any other suitable operating parameters. Based on such analysis, controller 44 may be configured to calculate a suitable time delay for actuating valve 76 (i.e., the amount of time between the when seed sensor 72 detects a seed 56 and when valve 76 needs to be opened to spray fluid F on and/or adjacent to each seed 56).

In addition to determining the time delay for actuating valve 76, controller 44 may also be configured to control the operation of valve 76 such that a specific volume of fluid F is applied on and/or adjacent to each seed 56. Specifically, in several embodiments, the controller 44 may be configured to analyze one or more operating parameters of system 40 in order to determine the duration of the valve pulse (i.e., the amount of time valve 76 is opened) needed to achieve a desired spray volume for each seed 56. Such operating parameters may include, but are not limited to, the pressure of the fluid F supplied to valve 76, the valve configuration (e.g., the sizes of the inlet and/or outlet of valve 76), the nozzle configuration (e.g., the spray tip orifice size), the speed V of system 40 and/or any other suitable operating parameters. By analyzing such operating parameters, controller 44 may be configured to control the duration of the valve pulse in a manner that allows the same amount of the fluid F to be sprayed on and/or adjacent to each seed 56.

Alternatively, controller 44 may be configured to implement a fixed application approach, wherein valve 76 is operated at a constant pulse duration. In such an embodiment, the specific volume of fluid F applied on and/or adjacent to each seed 56 may generally vary depending on the speed V of the system 40 and/or the pressure of the fluid F supplied to valve 76.

Additionally, in some embodiments, controller 44 may also be configured to control a flow rate of the fluid F supplied to valve 76 by controlling the operation of a suitable flow regulating valve 86. For example, controller 44 may be configured to determine the flow rate of the fluid F supplied through the fluid supply line 82 based on inputs received from one or more suitable meters and/or sensors positioned upstream of the valve 76, such as one or more turbine meters 88 associated with the pump 84, one or more tank level meters 90 associated with the fluid source 80, one or more flow meters 92 associated with the fluid supply line 82, one or more pressure sensors 94 and/or the like. In addition, controller 44 may also be configured to receive user inputs corresponding to a desired flow rate for the system 40. Accordingly, based on such inputs, controller 44 may be configured to control the operation of flow regulating valve 86 so as to maintain the fluid F supplied to valve 76 at the desired flow rate.

Further, in some embodiments, controller 44 may also be configured to control the pressure of the fluid F supplied to valve 76. For example, one or more pressure sensors 94 may be configured to monitor the pressure of the fluid F and transmit pressure measurements to controller 44. Controller 44 may, in turn, be configured to pulse valve 76 at a suitable frequency and/or duty cycle in order to maintain a specific pressure within fluid supply line 82. Such pressure based control may allow controller 44 to vary the amount of fluid F being sprayed on and/or adjacent to each seed 56 while operating the valve at a constant pulse duration.

Controller 44 may generally comprise any suitable computer and/or other processing unit, including any suitable combination of computers, processing units and/or the like that may be operated independently or in connection within one another. Thus, in several embodiments, controller 44 may include one or more processor(s) and associated memory device(s) configured to perform a variety of computer-implemented functions including, but not limited to, the functions disclosed herein. As used herein, the term "processor" refers not only to integrated circuits, but also refers to a microcontroller, a microcomputer, a programmable logic controller (PLC), an application specific integrated circuit, and other programmable circuits. Additionally, the memory device(s) of controller 44 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure and/or cause the associated controller to perform various functions including, but not limited to, controlling one or more operating parameters of the nozzle assemblies 52 (e.g., duty cycle and/or pulse duration) to control fluid flow through system 40.

In the illustrated embodiment, system 40 also includes a fluid return line 96 connected in fluid communication with an outlet of nozzle assembly 52. Return line 96 is configured to direct fluid from nozzle assembly 52 back to the fluid supply line 82 to provide for uninterrupted flow through fluid supply line 82. More specifically, nozzle assembly 52, in particular valve 76, is configured to alternately direct incoming fluid from fluid supply line 82 between return line 96 and a spray outlet of nozzle assembly 52 to dispense fluid on or adjacent to each seed 56. In some embodiments, for example, valve 76 is positionable between a first position, in which fluid is permitted to flow from fluid supply line 82 to return line 96, and a second position, in which fluid is permitted to flow from fluid supply line 82 to the spray outlet of nozzle assembly 52. In some embodiments, when in the first position, valve 76 seals the flow path between fluid supply line 82 and the spray outlet of nozzle assembly 52 such that valve 76 prevents fluid flow from being sprayed out of the spray outlet, and when in the second position, valve 76 seals the flow path between fluid supply line 82 and return line 96 such that valve 76 prevents fluid flow from fluid supply line 82 to return line 96.

The configuration of nozzle assembly 52 and return line 96 provides for a continuous flow of fluid through fluid supply line 82 and components connected to fluid supply line 82, such as pump 84, turbine flow meter 88, and inlets of valves 76. As a result, detrimental effects associated with dynamic pulsing and flow, such as inaccurate fluid application and/or flow rates dispensed through individual nozzle assemblies, inaccurate flow meters readings, and unstable valve inlet and outlet conditions, are reduced or eliminated.

In some embodiments, return line 96 is a common return line connected in fluid communication with more than one nozzle assembly 52 (e.g., via a hose or other suitable fluid conduit). In some embodiments, for example, return line 96 is connected in fluid communication with each nozzle assembly 52 of system 40. In other embodiments, system 40 may include more than one return line 96. In some embodiments, for example, system 40 may include a first common return line connected in fluid communication with each nozzle assembly 52 on the left half of a boom, and a second common return line connected in fluid communication with each nozzle assembly 52 on the right half of the boom. In yet other embodiments, each nozzle assembly 52 may be fluidly connected to fluid supply line 82 via a separate or dedicated return line.

The return line 96 may have any suitable flow conduit configuration that enables system 40 to function as described herein. In some embodiments, for example, return line 96 may be implemented as a hose or pipe. Further, in some embodiments, return line 96 has a larger flow capacity than fluid supply line 82 to prevent fluctuations in return line flow from changing the backpressure in fluid supply line 82. Further, in some embodiments, return line 96 may include a check valve fluidly connected between the return line and the fluid supply line 82 to prevent pressure fluctuations in fluid supply line 82.

In some embodiments, return line 96 may connect to fluid supply line 82 downstream of flow meters connected to fluid supply line 82, such as turbine meter 88 and flow meter 90. Consequently, fluid flow from the return line 96 will not be measured by turbine meter 88 and flow meter 92. Rather, turbine meter 88 and flow meter 92 will measure only fluid flow of fluid supplied from the tank 80, and thus the amount of fluid flow measured by the flow meter 92 is representative of the amount of fluid being sprayed or output by system 40. In the illustrated embodiment, return line 96 is connected to an inlet of pump 84, and flow meter 92 is fluidly connected to a suction pipe between fluid tank 80 and the inlet of pump 84.

In other embodiments, return line 96 may connect to fluid supply line 82 upstream of sensors and/or flow meters connected to fluid supply line 82. In such embodiments, controller 44 may be configured to account for or "factor out" additional fluid flow through flow meters resulting from fluid flow from return line 96 to accurately determine an amount of fluid being applied to ground 36. This facilitates use of return line 96 in systems including conventional rate controllers, which would otherwise interpret the additional fluid flow from return line through the flow meter as over application of fluid to the field, and would reduce the flow rate through the fluid supply line 82, resulting in under application of fluid. In some embodiments, controller 44 determines or calculates the actual amount of fluid being output or sprayed by system 40 by dividing a flow meter output signal received from the rate controller by a synchronous duty cycle of valve 76. In embodiments where separate valves 76 operate at independent duty cycles, controller 44 may be configured to divide the flow meter output signal from the rate controller by an average duty cycle of all valves 76.

Additionally, in some embodiments, controller 44 may be configured to calculate a flow rate (e.g., gallons per minute) and/or an application rate (e.g., gallons per acre) of fluid flow through system 40 based on system operating parameters. In some embodiments, for example, controller 44 may be configured to calculate a flow rate through fluid supply line 82 based on a sensed pressure of fluid within fluid supply line 82, flow coefficients ($C_v$) or sizes associated with orifices of each nozzle assembly 52, such as a valve outlet orifice, a spray outlet or spray tip orifice, and a return line orifice, the density of fluid being applied by system 40, and the duty cycle at which valve 76 of each nozzle assembly 52 is being operated.

In one embodiment, for example, controller 44 is configured to calculate a flow rate through fluid supply line 82 using the simplified orifice equation:

$$Q = C_v \sqrt{\frac{\Delta P}{SG}}$$

where Q is the volumetric flow rate (e.g., gallons per minute), $C_v$ is the flow coefficient of the orifice through which the fluid is flowing, $\Delta P$ is the pressure differential across the orifice, and SG is the specific gravity of the fluid. In the case of a plurality of nozzle assemblies 52 including three-way valves 76, controller 44 may be configured to calculate the flow rate through each nozzle assembly 52, including fluid flow through a spray outlet of nozzle assembly 52 and fluid flow to return line 96, and sum the individual flow rates to determine the total volumetric flow rate through fluid supply line 82. In one embodiment, for example, controller 44 calculates the fluid flow rate through each nozzle assembly 52 using the equation:

$$Q = \left(C_{v1}\sqrt{\frac{\Delta P}{SG}} * DC\ \%\right) + \left(C_{v2}\sqrt{\frac{\Delta P}{SG}} * (1 - DC\ \%)\right)$$

where $C_{v1}$ is the flow coefficient associated with the spray outlet orifice of nozzle assembly 52, $C_{v2}$ is the flow coefficient associated with the a return line outlet orifice of nozzle assembly 52, and DC % is the duty cycle at which valve 76 of nozzle assembly is being operated. In some embodiments, controller 44 may also be configured to account for multiple orifices in series associated with the spray outlet and/or the return line outlet of nozzle assembly 52 in calculating flow rates. For example, controller 44 may be configured to calculate a flow coefficient value, $C_{v,tot}$, for two orifices in series associated with the spray outlet of nozzle assembly 52 using the equation:

$$C_{v,tot} = \frac{1}{\sqrt{\frac{1}{C_{v1,1}^2} + \frac{1}{C_{v1,2}^2}}}$$

where $C_{v1,1}$ is the flow coefficient of a first orifice associated with the spray outlet of nozzle assembly 52 (e.g., a valve orifice) and $C_{v1,2}$ is the flow coefficient of a second orifice associated with the spray outlet of nozzle assembly 52 (e.g., the spray outlet orifice or a spray tip orifice). The same equation may be used to calculate a flow coefficient value associated with a return line outlet of nozzle assembly 52.

Additionally, controller 44 may be configured to calculate a combined flow rate of fluid being dispensed through the spray outlet of each nozzle assembly 52 based the calculated flow rate through the fluid supply line 82 and the duty cycle at which valve 76 of each nozzle assembly 52 is being operated. In embodiments where separate valves 76 operate at independent duty cycles, controller 44 may be configured to multiply the calculated flow rate through the fluid supply line 82 by an average duty cycle of all valves 76. Alternatively, controller 44 may be configured to calculate the flow rate through each individual nozzle assembly 52 (e.g., using the orifice equations described above), and sum the individual flow rates to determine the combined flow rate of fluid being dispensed through the spray outlet of each nozzle assembly 52.

Controller 44 may also be configured to calculate an overall application rate of fluid being applied by system 40 based on the calculated combined flow rate, a travel speed of system 40, and a boom width or effective spray width of system 40. For example, controller 44 may divide the calculated combined flow rate by the travel speed of system, and multiply the resulting value by the boom width or effective spray width of system 40 to calculate the overall application rate of system.

Controller 44 may receive real-time operating parameters of system 40 from valves 76 and one or more sensors or meters of system, such as turbine meter 88, tank level meter 90, flow meter 92, and pressure sensor 94. Other system parameters, such as flow coefficients, orifice sizes, fluid density, boom width, and effective spray width, may be input to controller 44 via a suitable user interface.

In addition to other benefits and advantages described herein, the use of return line 96 also facilities retrofitting pulsing or PWM valves on fluid application systems that include a positive displacement pump. For example, some fluid application systems, such as system 40, may include a positive displacement pump that is configured to maintain a constant fluid application rate through the system (e.g., 5 gallons per acre) regardless of the travel speed of the system. For example, as the system speeds up, the positive displacement pump will increase the flow rate of fluid through the fluid supply line to maintain a constant application rate. When PWM valves are implemented on such a system, issues may arise resulting from the on/off pulsing of the valves and the positive displacement pump trying to maintain a continuous fluid flow through the fluid supply line (e.g., pressure spikes in the fluid supply line that could damage components of fluid application system). Fluid return line 96 prevents such issues by providing a flow path for fluid being pumped through fluid supply line 82 by the positive displacement pump such that the fluid always has somewhere to go—whether through the spray outlet of nozzle assembly 52 or through return line 96.

The system 40 of FIGS. 1-3 is provided by way of example only. In other embodiments, system 40 may have any other suitable configuration that enables system 40 to function as described herein. Additionally, system 40 is not limited to any particular number or configuration of nozzle assemblies 52.

Although seed planting system 40 is described herein with reference to spraying seeds 56, planter 12 may generally be utilized to spray any suitable type of plant and/or plant precursor, such as seeds, seedlings, transplants, encapsulated tissue cultures and/or any other suitable plant precursors. In some embodiments, planter 12 may not plant seed 56 and/or may not be configured to plant seeds 56, and instead may be configured to spray fluid F on and/or adjacent to existing seeds, plants, or other targets.

Figure 4:
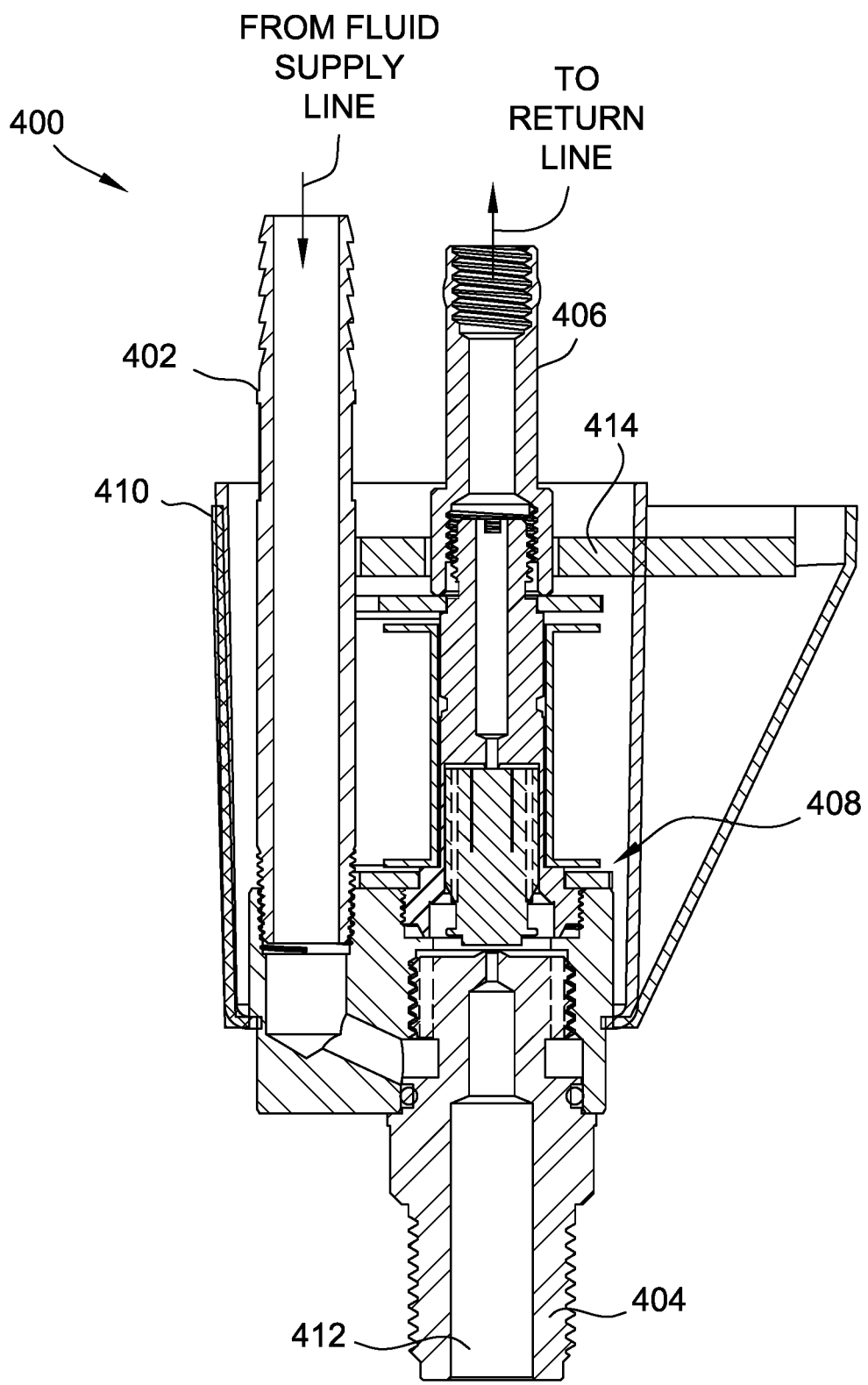
FIG. 4 is a sectional view of a nozzle assembly suitable for use in the seed planting system shown in FIGS. 1-3.

FIG. 4 is a sectional view of an example nozzle assembly 400 suitable for use in the system 40 of FIGS. 1-3. In this embodiment, nozzle assembly 400 includes an inlet 402, a nozzle 404, a return line outlet 406, and an electrically actuated (e.g., solenoid) three-way valve 408. In this embodiment, nozzle assembly 400 also includes a housing 410 that encloses valve 408 and portions of inlet 402, return line outlet 406, and nozzle 404.

Figure 5:
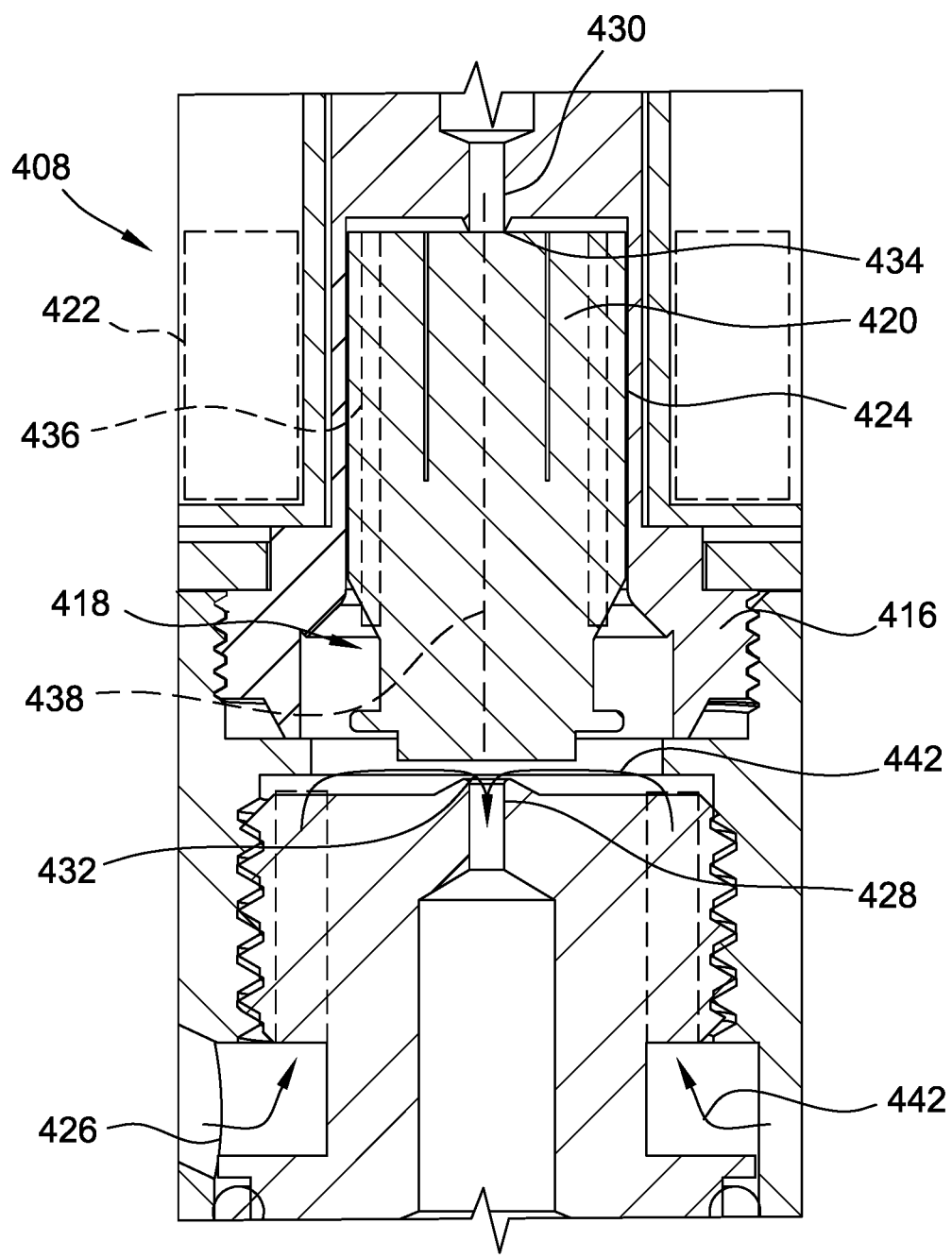
FIG. 5 is an enlarged sectional view of the nozzle assembly of FIG. 4 showing a valve of the nozzle assembly in a second position.
Figure 6:
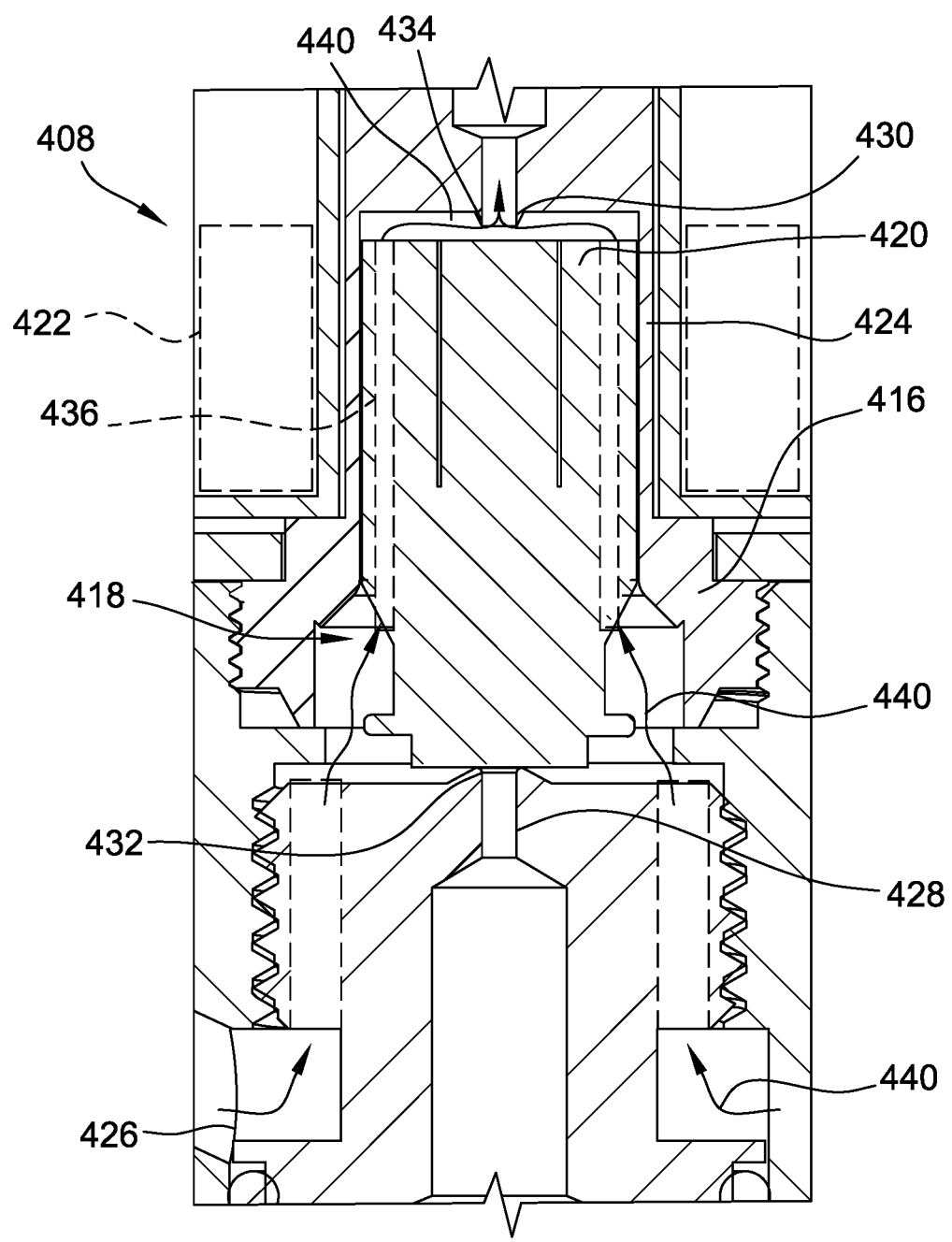
FIG. 6 is an enlarged sectional view of the nozzle assembly of FIG. 4 showing the valve of the nozzle assembly in a first position.

Inlet 402 is connected to fluid supply line 82 for receiving fluid therefrom, and return line outlet 406 is connected in fluid communication with return line 96. Nozzle 404 defines a spray outlet 412 for dispensing fluid from nozzle assembly 400. As shown in FIG. 4, in this embodiment, nozzle 404 includes external threads to enable a spray tip (e.g., spray tip 78, shown in FIG. 3) to be connected to nozzle 404 to produce a desired spray pattern from spray outlet 412. Valve 408 is fluidly connected between inlet 402 and each of spray outlet 412 and return line outlet 406, and is configured to alternately direct fluid from inlet 402 to return line outlet 406 and spray outlet 412. More specifically, valve 408 is positionable in a first position (shown in FIG. 6) in which the flow path between inlet 402 and spray outlet 412 is closed and the flow path between inlet 402 and return line outlet 406 is open, and a second position (shown in FIGS. 4 and 5) in which the flow path between inlet 402 and spray outlet 412 is open and the flow path between inlet 402 and return line outlet 406 is closed. Thus, when valve 408 is in the second position, fluid flow is permitted from the inlet 402 to the spray outlet 412 to dispense fluid on and/or adjacent to seeds 56, and when valve is in the first position, fluid flow is permitted from the inlet 402 to the return line outlet 406 such that a continuous fluid flow through valve 408 is established.

Valve 408 is communicatively connected to controller 44 (directly or indirectly, e.g., through one or more other controllers or drivers) for receiving drive or actuation signals therefrom. For example, controller 44 may output an actuating signal to valve 408 upon detecting a seed 56 falling through seed tube 50 such that valve 408 is actuated from the first position to the second position and fluid is dispensed from spray outlet 412.

In this embodiment, nozzle assembly 400 also includes a localized controller 414 at nozzle assembly 400. Localized controller 414 is communicatively connected to controller 44 via a suitable communication network. In some embodiments, localized controller 414 is connected to controller 44 via a controller area network (CAN) bus. Localized controller 414 may receive system operating parameters and other system data from controller 44 via the CAN bus. Additionally, in some embodiments, localized controller 414 may be connected to controller 44 and/or a drive circuit of controller 44 (e.g., a square wave generator) via a high speed communication line for receiving valve driving signals, such as PWM signals. In such embodiments, localized controller 414 may be configured to modify or adapt an incoming valve driving signal from controller 44 to account for one or more system parameters, including, for example and without limitation, valve parameters and real-time system operating parameters and conditions. In some embodiments, for example, localized controller 414 may adjust an opening and/or closing time of valve 408 based on valve parameters, such as known valve-lag times at given operating pressures. Further, in some embodiments, localized controller 414 may include suitable circuitry and be configured to modulate the voltage of an actuation signal supplied to valve 408 in order to increase a maximum opening pressure differential of valve 408. Suitable circuitry and logic for performing such methods are described in U.S. Patent Application No. 62/540,630, filed Aug. 3, 2017, the disclosure of which is hereby incorporated by reference in its entirety.

FIG. 5 is an enlarged sectional view of nozzle assembly 400 showing valve 408 in the second position, and FIG. 6 is an enlarged sectional view of nozzle assembly 400 showing valve 408 in the first position. As shown in FIGS. 5 and 6, valve 408 includes a valve body 416 defining a poppet cavity 418, a poppet 420 disposed within poppet cavity 418, and a solenoid coil 422 (shown in dashed lines) located on and/or around a poppet guide 424 of valve body 416.

Valve body 416 further defines a valve inlet 426 providing fluid flow between nozzle assembly inlet 402 (shown in FIG. 4) and poppet cavity 418, a first valve outlet 428 providing fluid flow between poppet cavity 418 and spray outlet 412 (shown in FIG. 4), and a second valve outlet 430 providing fluid flow between poppet cavity 418 and return line outlet 406 (shown in FIG. 4). First valve outlet 428 and second valve outlet 430 are defined by respective first and second valve seats 432 and 434 of valve body 416.

Poppet 420 is moveable within poppet cavity 418 between a first position (shown in FIG. 6), in which poppet 420 seals against first valve seat 432 to seal first valve outlet 428 and permits fluid flow through second valve outlet 430, and a second position (shown in FIG. 5) in which poppet 420 seals against second valve seat 434 to seal second valve outlet 430 and permits fluid flow through first valve outlet 428. In some embodiments, poppet 420 includes one or more rubber disks or other suitable sealing members configured to press against first valve seat 432 and/or second valve seat 434 to facilitate forming a leak-free seal. Further, in some embodiments, valve 408 may include a spring or other suitable biasing element (not shown in FIGS. 5 and 6) connected between valve body 416 and poppet 420 to bias poppet 420 towards the first position or the second position. In this embodiment, valve 408 includes a spring that biases poppet towards a first position such that when coil 422 is not energized, poppet 420 is biased towards the first position.

In this embodiment, poppet 420 includes a plurality of longitudinal grooves or channels 436 defined in a radial outer surface of poppet 420 and spaced circumferentially around a central longitudinal axis 438 of poppet 420. Channels 436 allow fluid to flow from valve inlet 426 to return line outlet 406 when poppet 420 is in the first position. Fluid flow through valve 408 when valve 408 is in the first position is indicated by fluid flow arrows 440 in FIG. 6.

Fluid flow through valve 408 when valve 408 is in the second position is indicated by fluid flow arrows 442 in FIG. 5.

Coil 422 is connected to controller 44 and/or localized controller 414 to regulate or control the current provided to coil 422. Coil 422 may be configured to receive a controlled electric current or electric signal from controller 44 and/or localized controller 414 such that poppet 420 may move within guide 424 relative to first valve outlet 428 and/or second valve outlet 430. For example, in one embodiment, controller 44 and/or localized controller 414 include a square wave generator, a coil drive circuit, or any other suitable device that is configured to apply a regulated current to coil 422, thereby creating a magnetic field which biases (by attraction or repulsion) poppet 420 toward one of first position or second position. As a result, poppet 420 may be moved between first position and second position to control fluid flow through valve 408. Additionally, the attraction between coil 422 and poppet 420 may also allow poppet 420 to be pulsated or continuously cyclically repositioned, thereby providing for control of the average flow rate through each of first valve outlet 428 and second valve outlet 430.

Figure 7:
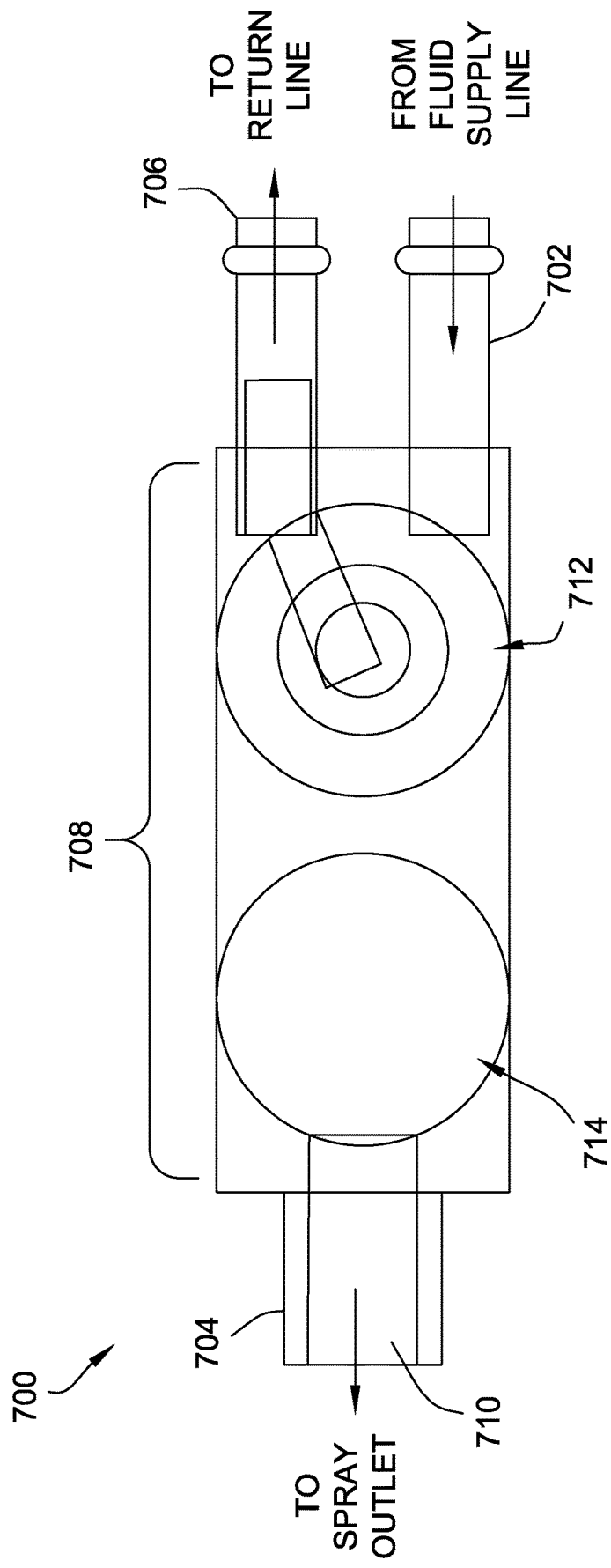
FIG. 7 is a schematic top view of another embodiment of a nozzle assembly suitable for use in the seed planting system shown in FIGS. 1-3.
Figure 8:
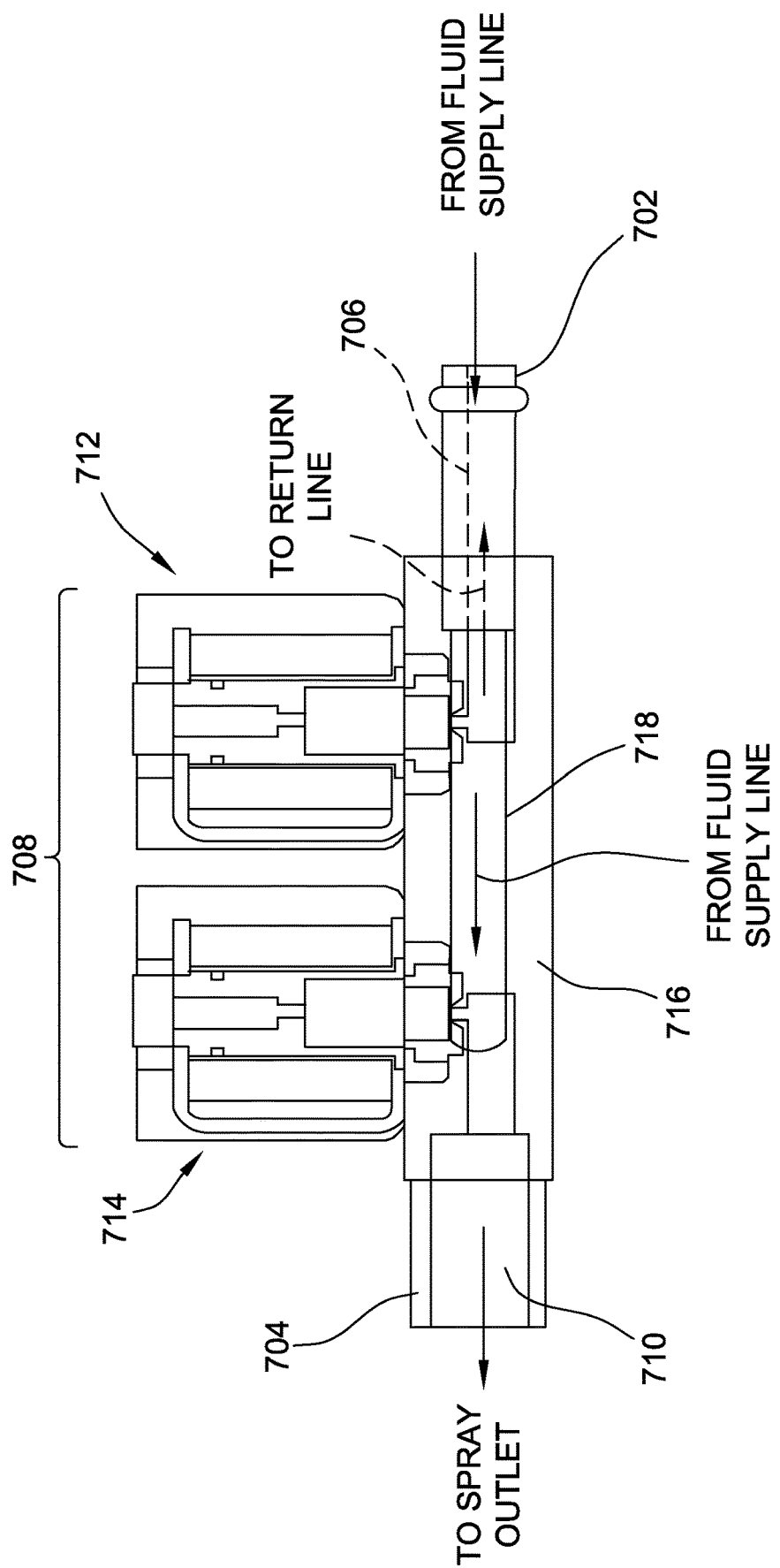
FIG. 8 is a schematic sectional view of the nozzle assembly shown in FIG. 7.

FIG. 7 is a schematic top view of another embodiment of a nozzle assembly 700 suitable for use in the system 40 of FIGS. 1-3. FIG. 8 is a schematic sectional view of nozzle assembly 700. In this embodiment, nozzle assembly 700 includes an inlet 702, a nozzle 704, a return line outlet 706, and a valve assembly 708. Inlet 702 is connected to fluid supply line 82 (shown in FIG. 4) for receiving fluid therefrom, and return line outlet 706 is connected in fluid communication with return line 96 (shown in FIG. 4). Nozzle 704 defines a spray outlet 710 for dispensing fluid from nozzle assembly 700. Nozzle 704 may include external threads to enable a spray tip (e.g., spray tip 78, shown in FIG. 3) to be connected to nozzle 704 to produce a desired spray pattern from spray outlet 710.

Valve assembly 708 includes a first electrically-actuated valve 712 and a second electrically-actuated valve 714. In this embodiment, each of first valve 712 and second valve 714 is a pulsing valve, and may generally have any suitable valve configuration that enables system 40 (shown in FIGS. 1-3) to function as described herein. In some embodiments, for example, each of first valve 712 and second valve 714 may be configured as a latching solenoid valve, 2WNC solenoid valve, pilot actuated solenoid valve, flipper solenoid valve and/or the like.

Further, in this embodiment, nozzle assembly 700 includes a manifold 716 defining a common inlet channel 718 providing fluid flow from inlet 702 to each of spray outlet 710 and return line outlet 706. First valve 712 is fluidly connected between inlet channel 718 and return line outlet 706, and second valve 714 is fluidly connected between inlet channel 718 and spray outlet 710. Accordingly, fluid flow is permitted from the inlet channel 718 to the return line outlet 706 when first valve 712 is open, and fluid flow is permitted from the inlet channel 718 to the spray outlet 710 when the second valve 712 is open.

Valve assembly 708, including first valve 712 and second valve 714, is connected to controller 44 (directly or indirectly, e.g., through one or more other controllers or drivers) for receiving drive or actuation signals therefrom. For example, controller 44 (shown in FIG. 3) may output actuating signals to each of first valve 712 and second valve 714 upon detecting a seed 56 (shown in FIG. 3) falling through seed tube 50 (shown in FIG. 3) such that fluid is dispensed from spray outlet 710.

In this embodiment, valve assembly 708 is configured to act as a three-way valve to alternately direct fluid from inlet 702 to return line outlet 706 and spray outlet 710. More specifically, controller 44 is configured to actuate first valve 712 and second valve 714 into opposite positions (e.g., open and closed) such that when first valve 712 is opened, second valve 714 is closed, and when first valve 712 is closed, second valve 714 is opened. Controller 44 may be configured to actuate first valve 712 and second valve 714 into opposite positions simultaneously, or may actuate first valve 712 and second valve 714 out of sync with one another.

In some embodiments, the nozzle assemblies and return lines described herein may be implemented on a fluid spraying system. In such embodiments, the nozzle assemblies, and in particular, the valves of nozzle assemblies, may be pulsed or actuated by a controller of the system (e.g., controller 44) at a pre-set or determined frequency and duty cycle to control the average flow rate of fluid through the nozzle assemblies. Moreover, in such embodiments, each valve of each nozzle assembly may be operated independently from one another. Suitable frequencies at which the valves may be pulsed includes between 1 Hertz (Hz) and 40 Hz, between 5 Hz and 30 Hz, between 10 Hz and 30 Hz, and between 20 Hz and 40 Hz.

Embodiments of the systems described facilitate more accurate application of fluids to surfaces as compared to prior systems. For example, embodiments of the systems described herein include a fluid return line connected to a nozzle assembly that allows for continuous fluid flow through the fluid application system, even when a valve of the nozzle assembly closes the spray outlet of the nozzle assembly. Systems described herein thereby facilitate reducing pressure fluctuations within fluid supply lines, thereby reducing detrimental effects associated with dynamic pulsing and flow, such as inaccurate fluid application and/or flow rates dispensed through individual nozzle assemblies, inaccurate flow meters readings, and unstable valve inlet and outlet conditions, are reduced or eliminated.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

When introducing elements of the present invention or the preferred embodiment(s) thereof, the articles "a", "an", "the" and "the" are intended to mean that there are one or more of the elements. The terms "comprising", "including" and "having" are intended to be inclusive and mean that there may be additional elements other than the listed elements. Moreover, the use of "top", "bottom", "above", "below" and variations of these terms is made for convenience, and does not require any particular orientation of the components.

As various changes could be made in the above without departing from the scope of the invention, it is intended that all matter contained in the above description and shown in the accompanying drawings shall be interpreted as illustrative and not in a limiting sense.

What is claimed is:

1. A fluid application system comprising:
a fluid supply line connected to a fluid supply;
a plurality of nozzle assemblies connected in fluid communication with the fluid supply line, each nozzle assembly of the plurality of nozzle assemblies including:
an inlet connected to the fluid supply line;
a nozzle defining a spray outlet;
a return line outlet; and
an electrically actuated three-way valve fluidly connected between the inlet and each of the spray outlet and the return line outlet, the electrically actuated three-way valve configured to alternately direct fluid from the inlet to the return line outlet and the spray outlet, wherein the electrically actuated three-way valve seals a flow path to the spray outlet when the electrically actuated three-way valve directs fluid from the inlet to the return line outlet; and
a return line connected in fluid communication with the return line outlet of each of the plurality of nozzle assemblies and configured to direct fluid from the return line outlet to the fluid supply line.

2. The fluid application system of claim 1 further comprising a flow meter connected to the fluid supply line and configured to measure an amount of fluid flow through the fluid supply line, wherein the return line is fluidly connected to the fluid supply line downstream of the flow meter.

3. The fluid application system of claim 2 further comprising:
a tank for holding the fluid; and
a pump fluidly connected between the tank and the fluid supply line, wherein the flow meter is fluidly connected between the tank and the pump, and wherein the return line is connected to an inlet of the pump.

4. The fluid application system of claim 1 further comprising a controller connected in communication with the electrically actuated three-way valve of each of the plurality of nozzle assemblies and configured to output an actuation signal to the electrically actuated three-way valve of each of the plurality of nozzle assemblies.

5. The fluid application system of claim 4, wherein the controller is configured to actuate the electrically actuated three-way valve at a frequency and duty cycle.

6. The fluid application system of claim 5, further comprising a pressure sensor connected in communication with the controller and configured to sense a pressure in the fluid supply line, wherein the controller is configured to determine a flow rate through the fluid supply line based at least on: the sensed pressure, a value associated with an orifice of the spray outlet, a value associated with an orifice of the return line outlet, and the duty cycle at which the electrically actuated three-way valve of each nozzle assembly is actuated.

7. The fluid application system of claim 4, wherein each nozzle assembly further comprises a localized controller mounted to the nozzle assembly and connected in communication with the controller and the electrically actuated three-way valve, wherein the localized controller is configured to receive the actuation signal from the controller and modify the actuation signal based on at least one system operating parameter.

8. The fluid application system of claim 4, wherein the controller is configured to control the electrically actuated three-way valve of each of the plurality of nozzle assemblies independently of one another.

9. The fluid application system of claim 1, wherein the electrically actuated three-way valve includes:
a valve body defining a poppet cavity, a valve inlet providing fluid flow between the inlet and the poppet cavity, a first valve outlet providing fluid flow between the poppet cavity and the spray outlet, and a second valve outlet providing fluid flow between the poppet cavity and the return line outlet; and
a poppet disposed within the poppet cavity and moveable between a first position, in which the poppet seals the first valve outlet and permits fluid flow through the second valve outlet, and a second position, in which the poppet seals the second valve outlet and permits fluid flow through the first valve outlet.

10. The fluid application system of claim 1, wherein the fluid includes at least one of water, a liquid fertilizer, and a pesticide.

11. A seed planting system for dispensing fluid on or adjacent to seeds dispensed from the system, the system comprising:
a seed dispenser configured to dispense seeds through at least one of a plurality of seed dispensing outlets and into a furrow;
a fluid supply line connected to a fluid supply;
a plurality of nozzle assemblies connected in fluid communication with the fluid supply line, each nozzle assembly of the plurality of nozzle assemblies located proximate to a respective one of the plurality of seed dispensing outlets and including:
an inlet connected to the fluid supply line;
a nozzle defining a spray outlet;
a return line outlet; and
an electrically actuated three-way valve fluidly connected between the inlet and each of the spray outlet and the return line outlet, the electrically actuated three-way valve configured to alternately direct fluid from the inlet to the return line outlet and the spray outlet to dispense fluid on or adjacent to each seed, wherein the electrically actuated three-way valve seals a flow path to the spray outlet when the electrically actuated three-way valve directs fluid from the inlet to the return line outlet; and
a return line connected in fluid communication with the return line outlet of each of the plurality of nozzle assemblies and configured to direct fluid from the return line outlet to the fluid supply line.

12. The seed planting system of claim 11 further comprising:
a sensor configured to detect a seed dropping through a tube of the seed dispenser; and
a controller connected in communication with the sensor and the electrically actuated three-way valve of each of the plurality of nozzle assemblies, the controller configured to output an actuation signal to the electrically actuated three-way valve of at least one of the plurality of nozzle assemblies in response to the sensor detecting a seed dropping through the seed tube.

13. The seed planting system of claim 12 wherein each nozzle assembly further comprises a localized controller mounted to the nozzle assembly and connected in communication with the controller and the electrically actuated three-way valve, wherein the localized controller is configured to receive the actuation signal from the controller and modify the actuation signal based on at least one system operating parameter.

14. The seed planting system of claim 12, wherein the controller is configured to control the electrically actuated three-way valve of each of the plurality of nozzle assemblies independently of one another.

15. The seed planting system of claim 11 further comprising a flow meter connected to the fluid supply line and configured to measure an amount of fluid flow through the fluid supply line, wherein the return line is fluidly connected to the fluid supply line downstream of the flow meter.

16. The seed planting system of claim 15 further comprising:
a tank for holding the fluid; and
a pump fluidly connected between the tank and the fluid supply line, wherein the flow meter is fluidly connected between the tank and the pump, and wherein the return line is connected to an inlet of the pump.

17. The seed planting system of claim 11, wherein the electrically actuated three-way valve includes:
a valve body defining a poppet cavity, a valve inlet providing fluid flow between the inlet and the poppet cavity, a first valve outlet providing fluid flow between the poppet cavity and the spray outlet, and a second valve outlet providing fluid flow between the poppet cavity and the return line outlet; and
a poppet disposed within the poppet cavity and moveable between a first position, in which the poppet seals the first valve outlet and permits fluid flow through the second valve outlet, and a second position, in which the poppet seals the second valve outlet and permits fluid flow through the first valve outlet.

18. A fluid application system comprising:
a fluid supply line connected to a fluid supply;
a plurality of nozzle assemblies connected in fluid communication with the fluid supply line, each nozzle assembly of the plurality of nozzle assemblies including:
an inlet connected to the fluid supply line;
a nozzle defining a spray outlet;
a return line outlet; and
a valve assembly including at least one electrically-actuated valve fluidly connected between the inlet and each of the spray outlet and the return line outlet, the valve assembly configured to alternately direct fluid from the inlet to the return line outlet and the spray outlet, wherein the valve assembly seals a flow path to the spray outlet when the valve assembly directs fluid from the inlet to the return line outlet; and
a return line connected in fluid communication with the return line outlet of each of the plurality of nozzle assemblies and configured to direct fluid from the return line outlet to the fluid supply line.

19. The fluid application system of claim 18, wherein the at least one electrically-actuated valve includes a first electrically-actuated valve and a second electrically-actuated valve, and wherein the valve assembly further includes a manifold defining a common inlet channel providing fluid flow from the inlet to each of the spray outlet and the return line outlet, wherein the first electrically-actuated valve is fluidly connected between the inlet channel the return line outlet, and the second electrically-actuated valve is fluidly connected between the inlet channel and the spray outlet.

20. The fluid application system of claim 19 further comprising a controller connected in communication with each of the first electrically-actuated valve and the second electrically-actuated valve, wherein the controller is configured to actuate the first electrically-actuated valve and the second electrically-actuated valve into opposite positions such that when the first electrically-actuated valve is open, the second electrically-actuated valve is closed, and when the first electrically-actuated valve is closed, the second electrically-actuated valve is opened.

\* \* \* \* \*